United States Patent
Panteleev et al.

(10) Patent No.: US 10,200,987 B2
(45) Date of Patent: *Feb. 5, 2019

(54) RESOURCE ALLOCATION TECHNIQUES FOR DEVICE-TO-DEVICE (D2D) COMMUNICATIONS

(71) Applicant: INTEL CORPORATION, Santa Clara, CA (US)

(72) Inventors: Sergey Panteleev, Nizhny Novgorod (RU); Alexey Khoryaev, Dzerzhinsk (RU); Debdeep Chatterjee, Santa Clara, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/457,687

(22) Filed: Mar. 13, 2017

(65) Prior Publication Data

US 2018/0035410 A1 Feb. 1, 2018

Related U.S. Application Data

(63) Continuation of application No. 14/583,650, filed on Dec. 27, 2014, now Pat. No. 9,629,145.

(60) Provisional application No. 61/968,286, filed on Mar. 20, 2014.

(51) Int. Cl.
*H04W 4/00* (2018.01)
*H04W 72/04* (2009.01)

(52) U.S. Cl.
CPC ...... *H04W 72/042* (2013.01); *H04W 72/0446* (2013.01)

(58) Field of Classification Search
CPC ..... H04W 8/005; H04W 28/26; H04W 68/00; H04W 72/04; H04W 72/0406; H04W 72/042; H04W 72/0446; H04W 72/082; H04W 72/1278; H04W 72/12; H04W 76/02; H04W 76/023; H04W 76/14; H04W 84/18; H04W 88/02; H04W 88/04; H04W 88/08
See application file for complete search history.

(56) References Cited

U.S. PATENT DOCUMENTS

| | | | |
|---|---|---|---|
| 8,532,035 B2 | 9/2013 | Moon et al. | |
| 9,603,127 B2 * | 3/2017 | Kim | H04W 76/14 |
| 9,654,443 B2 * | 5/2017 | Lindoff | H04W 8/005 |

(Continued)

OTHER PUBLICATIONS

Office Action and Search Report received for Russian Patent Application No. 2016134088, dated Apr. 3, 2017, 7 pages. (untranslated).
"Discussion on D2D broadcast resource allocation", 3GPP TSG RAN WG1, Meeting #76, R1-140130, Feb. 14, 2014.

(Continued)

*Primary Examiner* — Frank Duong

(57) ABSTRACT

Resource allocation techniques for D2D communications are described. In one embodiment, for example, user equipment may comprise one or more radio frequency (RF) transceivers, one or more RF antennas, and logic, at least a portion of which is in hardware, the logic to receive a D2D control information (D2DCI) message comprising D2D transmission pattern (DTP) information, identify a set of D2D transmission resources based on the DTP information, and send one or more D2D data messages using the set of D2D transmission resources. Other embodiments are described and claimed.

25 Claims, 10 Drawing Sheets

(56) References Cited

U.S. PATENT DOCUMENTS

| | | | |
|---|---|---|---|
| 9,681,479 B2* | 6/2017 | Kalhan | H04W 72/0493 |
| 2010/0240312 A1 | 9/2010 | Peng et al. | |
| 2012/0113904 A1 | 5/2012 | Anderson et al. | |
| 2013/0142268 A1 | 6/2013 | Gao et al. | |
| 2013/0223353 A1 | 8/2013 | Liu et al. | |
| 2013/0272132 A1 | 10/2013 | Heo et al. | |
| 2014/0056220 A1 | 2/2014 | Poitau et al. | |
| 2014/0094183 A1* | 4/2014 | Gao | H04W 72/048 455/450 |
| 2014/0328329 A1* | 11/2014 | Novlan | H04W 72/042 370/336 |
| 2014/0369292 A1 | 12/2014 | Wu et al. | |
| 2015/0055567 A1* | 2/2015 | Narasimha | H04W 76/14 370/329 |
| 2015/0215903 A1* | 7/2015 | Zhao | H04W 72/04 370/329 |

OTHER PUBLICATIONS

Office Action received for Canadian Patent Application No. 2,938,309 dated May 10, 2017, 6 pages.

"Introduction of D2D", 3GPP TSG-RAN WG1 Meeting #79, R1-145494, Nov. 17-21, 2014, 238 pages.

Office Action received for Japanese Patent Application No. 2016-551723, dated Sep. 28, 2017, 4 pages English translation.

Huawei, "Resource assignment for D2D communication", HiSilicon, 3GPP TSG-RAN WG1 Meeting #75 R1-135042, [online], Nov. 1, 2013, pp. 1-5, <http://www.3gpp.org/ftp/tsg_ran/WG1_RL1/TSGR1_75/Docs/R1-135042.zip>.

Extended European Search Report received for European Patent Application No. 157653841, dated Oct. 6, 2017, 10 pages.

"Discussion on D2D Resource Allocation Method," Intel, 3GPP TSG RAN WG1 Meeting #75, R1-135115, Nov. 11-15, 2013, 5 pages.

* cited by examiner

DTP 402
DTP 404
DTP 406
DTP 408

DTP *502*
DTP *504*
DTP *506*
DTP *508*

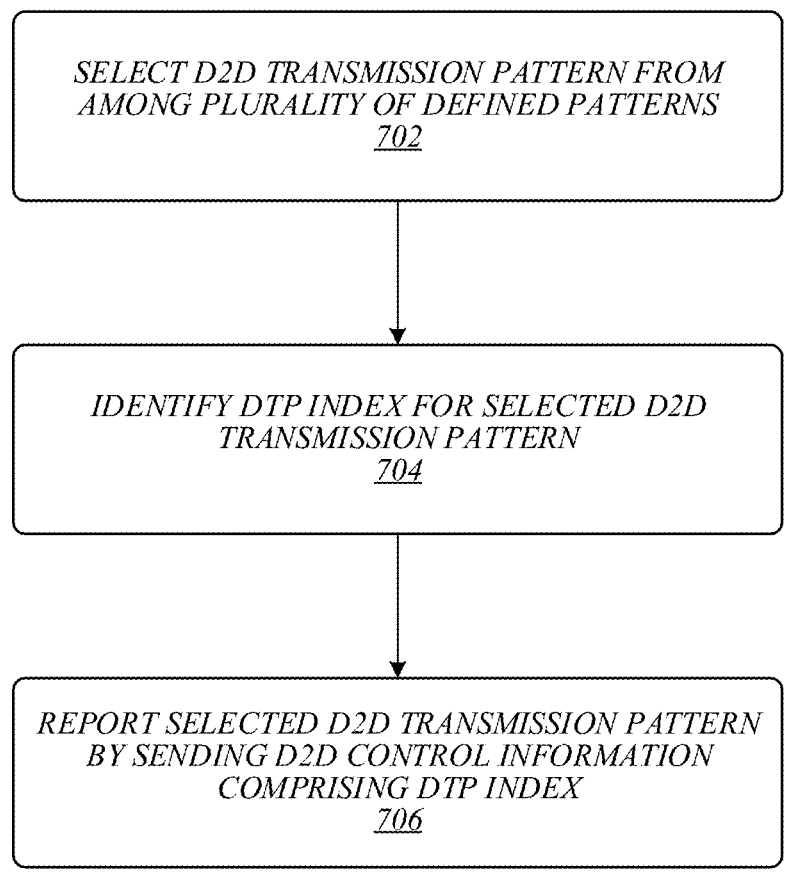

*FIG. 8A*

Storage Medium 800

Computer Executable
Instructions for 600

*FIG. 8B*

Storage Medium 850

Computer Executable
Instructions for 700

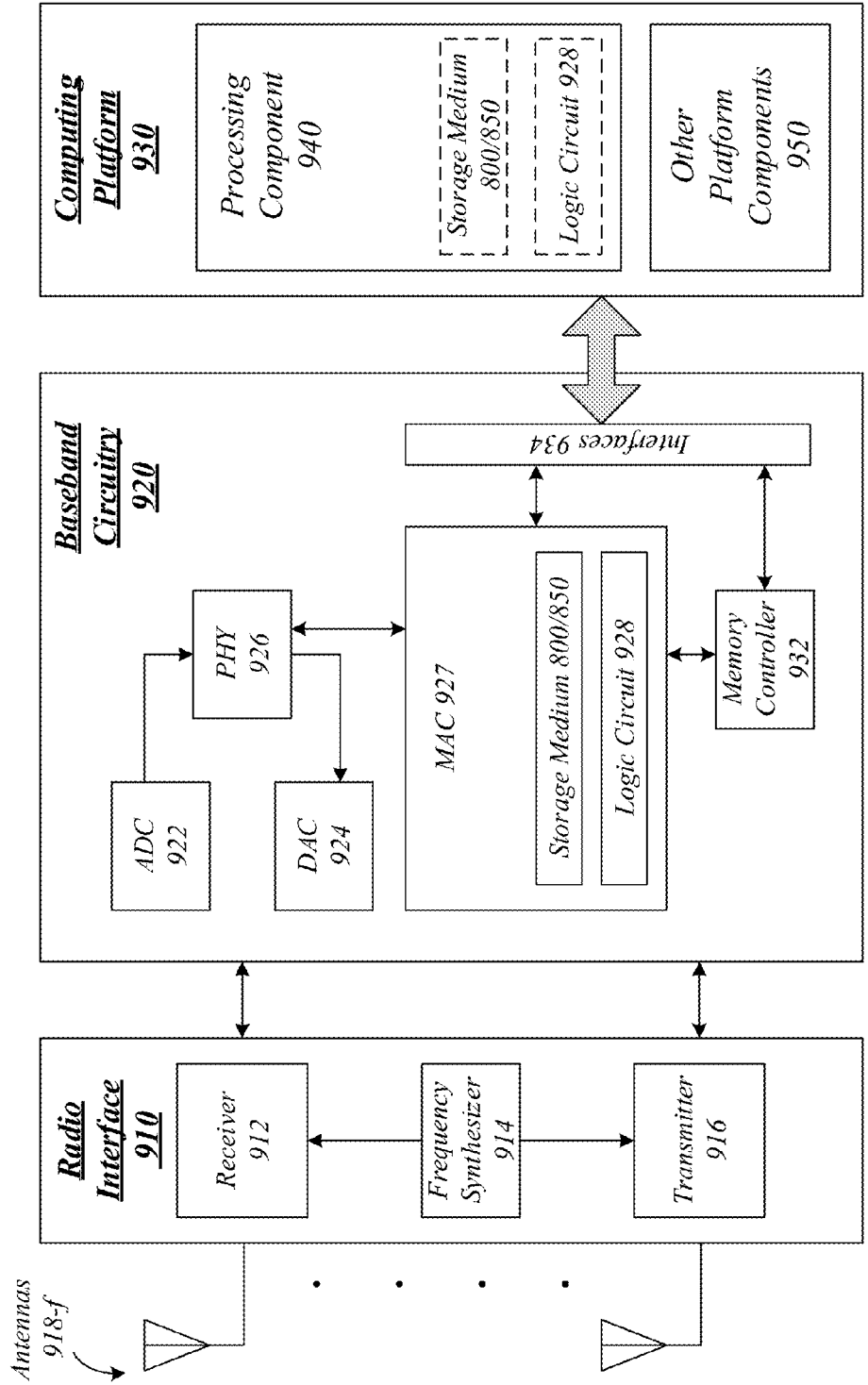

RESOURCE ALLOCATION TECHNIQUES FOR DEVICE-TO-DEVICE (D2D) COMMUNICATIONS

CROSS-REFERENCE TO RELATED APPLICATIONS

This application is a continuation of, claims the benefit of, and claims priority to U.S. patent application Ser. No. 14/583,650 entitled "RESOURCE ALLOCATION TECHNIQUES FOR DEVICE-TO-DEVICE (D2D) COMMUNICATIONS" filed Dec. 27, 2014, which claims the benefit of and priority to previously filed U.S. Provisional Patent Application No. 61/968,286, filed Mar. 20, 2014, the subject matter of which are hereby incorporated by reference in their entireties.

TECHNICAL FIELD

Embodiments herein generally relate to communications between devices in broadband wireless communications networks.

BACKGROUND

In an Evolved Universal Mobile Telecommunications System Terrestrial Radio Access Network (E-UTRAN), an evolved node B (eNB) may be responsible for allocating wireless channel resources to accommodate device-to-device (D2D) data transmissions of any D2D-capable user equipment (D2D UEs) that wish to perform such transmissions. An eNB can notify a D2D UE of resources allocated for D2D data transmissions by sending a scheduling grant to the D2D UE. Requiring the eNB to send a separate scheduling grant for each D2D data transmission may impose excessive, undesirable signaling overhead. In an out-of-coverage scenario in which a transmitting D2D UE does not have connectivity with an eNB, the transmitting D2D UE may autonomously select the wireless channel resources to be used to accommodate its D2D data transmission(s) to a recipient D2D UE. Regardless of whether an eNB allocates the resources for the transmitting D2D UE or the transmitting D2D UE autonomously selects those resources, the transmitting D2D UE needs to send control information to notify the recipient D2D UE of the wireless channel resources via which it will perform its D2D data transmission(s) to the recipient D2D UE. If the transmitting D2D UE is required to send control information identifying the specific resources to be used for each respective D2D data transmission, this may also constitute a cause of excessive signaling overhead. In order to reduce the signaling overhead associated with resource allocation for D2D transmissions, it may be desirable that eNBs and D2D UEs be configured to communicate D2D resource allocation information in a compact, non-message-specific format.

BRIEF DESCRIPTION OF THE DRAWINGS

FIG. 4 illustrates an embodiment of a first D2D transmission pattern set.
FIG. 5 illustrates an embodiment of a second D2D transmission pattern set
FIG. 7 illustrates an embodiment of a second logic flow.
FIG. 8A illustrates an embodiment of a first storage medium.
FIG. 8B illustrates an embodiment of a second storage medium.
FIG. 9 illustrates an embodiment a device.

DETAILED DESCRIPTION

Figure 1:
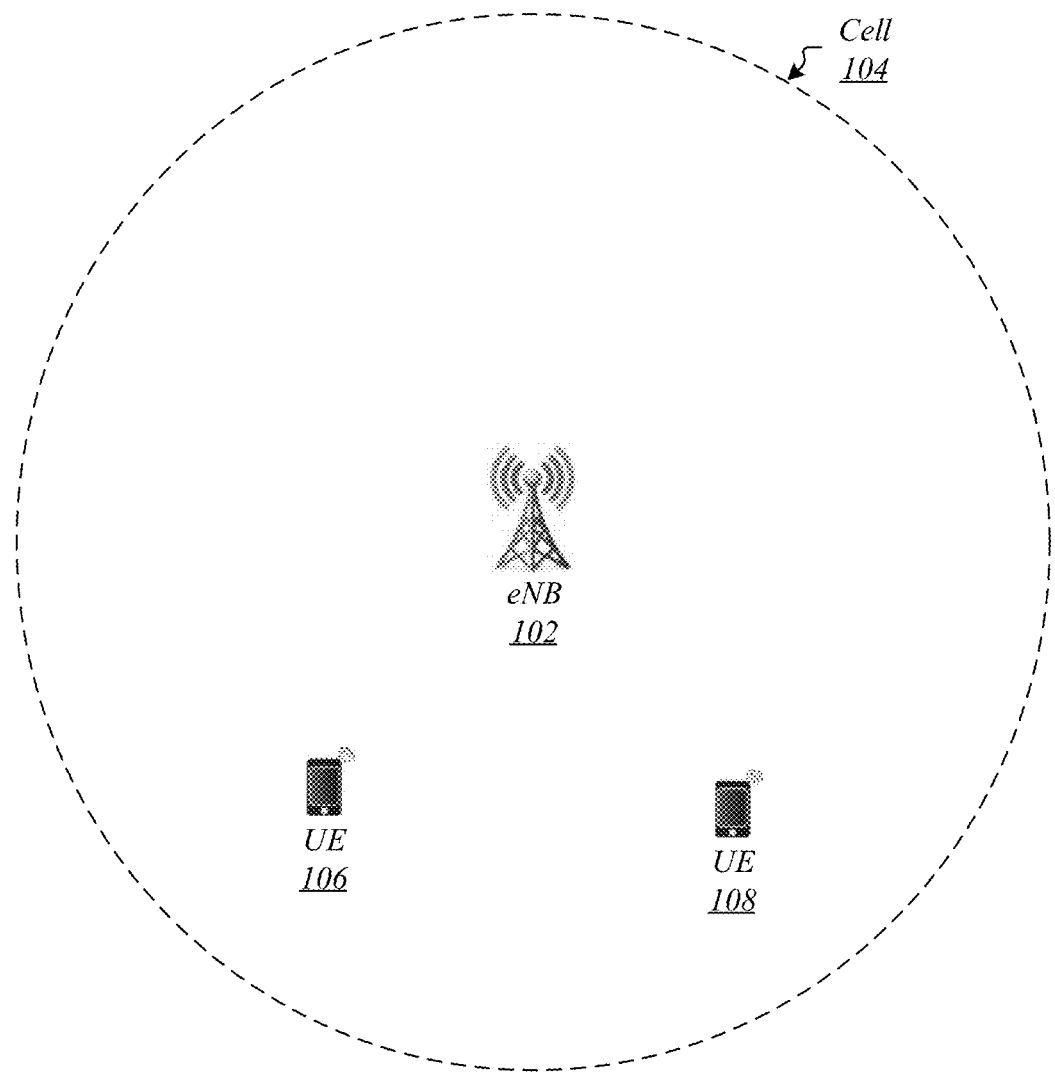
FIG. 1 illustrates an embodiment of a first operating environment.

Various embodiments may be generally directed to resource allocation techniques for D2D communications. In one embodiment, for example, user equipment may comprise one or more radio frequency (RF) transceivers, one or more RF antennas, and logic, at least a portion of which is in hardware, the logic to receive a D2D control information (D2DCI) message comprising D2D data transmission pattern (DTP) information, identify a set of D2D transmission resources based on the DTP information, and send one or more D2D data messages using the set of D2D transmission resources. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

The techniques disclosed herein may involve transmission of data over one or more wireless connections using one or more wireless mobile broadband technologies. For example, various embodiments may involve transmissions over one or more wireless connections according to one or more 3rd Generation Partnership Project (3GPP), 3GPP Long Term Evolution (LTE), and/or 3GPP LTE-Advanced (LTE-A) technologies and/or standards, including their predecessors, revisions, progeny, and/or variants. Various embodiments may additionally or alternatively involve transmissions according to one or more Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS) technologies and/or standards, including their predecessors, revisions, progeny, and/or variants.

Examples of wireless mobile broadband technologies and/or standards may also include, without limitation, any of the Institute of Electrical and Electronics Engineers (IEEE) 802.16 wireless broadband standards such as IEEE 802.16m and/or 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1xRTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their predecessors, revisions, progeny, and/or variants.

Some embodiments may additionally or alternatively involve wireless communications according to other wireless communications technologies and/or standards. Examples of other wireless communications technologies and/or standards that may be used in various embodiments may include, without limitation, other IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11ad, IEEE 802.11af, and/or IEEE 802.11ah standards, High-Efficiency Wi-Fi standards developed by the IEEE 802.11 High Efficiency WLAN (HEW) Study Group, Wi-Fi Alliance (WFA) wireless communication standards such as Wi-Fi, Wi-Fi Direct, Wi-Fi Direct Services, Wireless Gigabit (WiGig), WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards such as those embodied in 3GPP Technical Report (TR) 23.887, 3GPP Technical Specification (TS) 22.368, and/or 3GPP TS 23.682, and/or near-field communication (NFC) standards such as standards developed by the NFC Forum, including any predecessors, revisions, progeny, and/or variants of any of the above. The embodiments are not limited to these examples.

In addition to transmission over one or more wireless connections, the techniques disclosed herein may involve transmission of content over one or more wired connections through one or more wired communications media. Examples of wired communications media may include a wire, cable, metal leads, printed circuit board (PCB), backplane, switch fabric, semiconductor material, twisted-pair wire, co-axial cable, fiber optics, and so forth. The embodiments are not limited in this context.

FIG. 1 illustrates an example of an operating environment 100 in which the disclosed resource allocation techniques for D2D communications may be implemented in various embodiments. As shown in FIG. 1, an eNB 102 serves a cell 104, and generally provides wireless connectivity to UEs 106 and 108. In conjunction with providing such wireless connectivity, eNB 102 may perform operations such as managing radio resource control (RRC) states of UEs 106 and/or 108, allocating wireless channel resources for communications on the part of UEs 106 and/or 108, notifying UEs 106 and/or 108 of such allocated resources, and sending data to and/or receiving data from UEs 106 and/or 108. The way in which eNB 102 allocates wireless channel resources for communications on the part of UEs 106 and/or 108 may depend in part on the duplexing mode being used. In some embodiments, eNB 102 may implement frequency division duplexing (FDD), according to which it may allocate resources of one or more uplink (UL) channels to accommodate transmissions by UEs 106 and/or 108, and may allocate resources of one or more downlink (DL) channels to accommodate transmissions to UEs 106 and/or 108. In various other embodiments, eNB 102 may implement time division duplexing (TDD). In some embodiments in which TDD is implemented, eNB 102 may be operative to select and report a TDD configuration to UEs 106 and 108, and the TDD configuration may specify subframes or other time intervals to be used for UL communications and subframes or other time intervals to be used for DL communications. In such embodiments, eNB 102 may then be operative to allocate resources of one or more UL subframes or other time intervals to accommodate transmissions by UE 106 and/or UE 108. The embodiments are not limited in this context.

Figure 2:
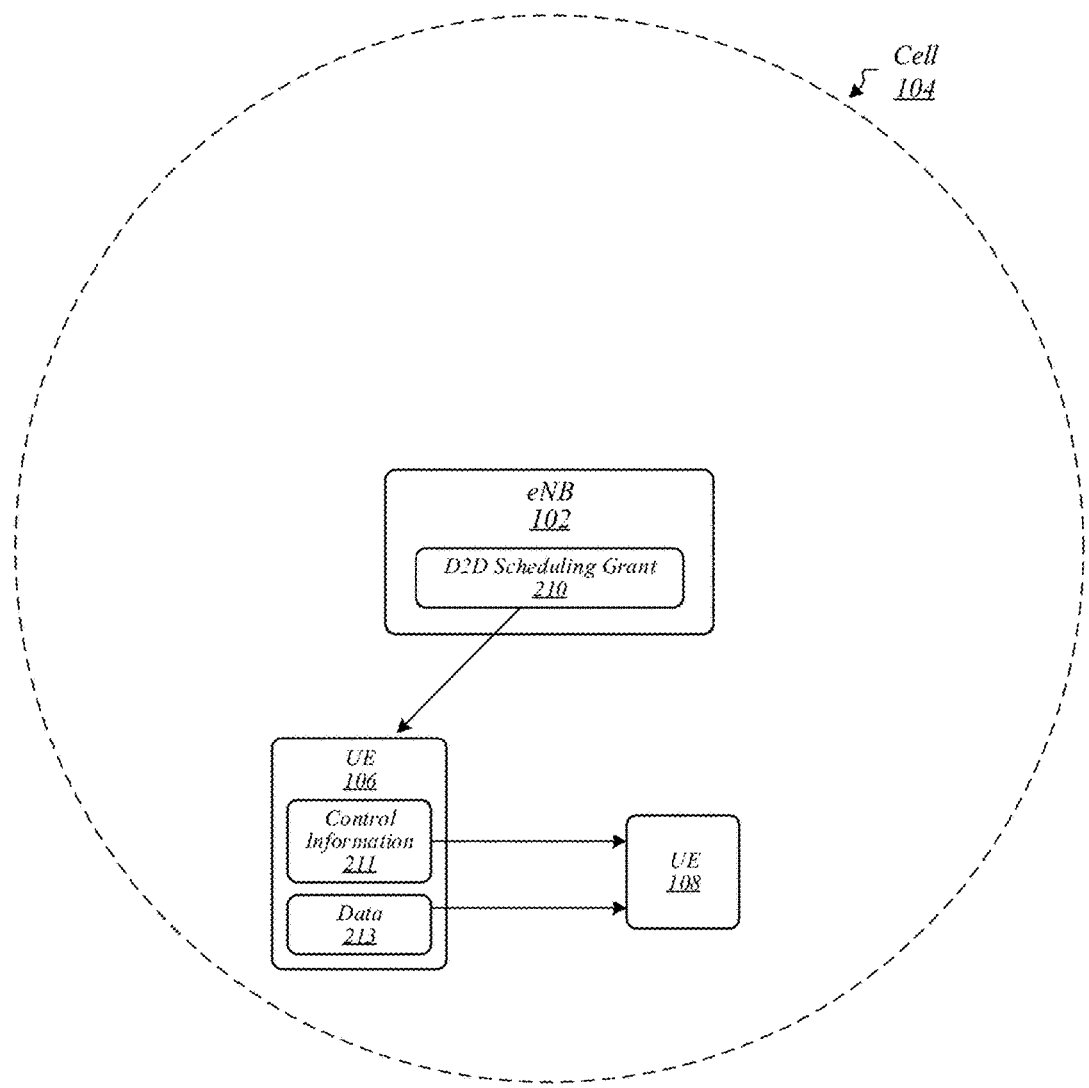
FIG. 2 illustrates an embodiment of a second operating environment.

FIG. 2 illustrates an example of an operating environment 200 in which the disclosed resource allocation techniques for D2D communications may be implemented in various embodiments. In operating environment 200, UEs 106 and 108 of FIG. 1 are configured with D2D communication capabilities, and UE 106 has data for D2D transmission to UE 108. eNB 102, which is responsible for allocated wireless channel resources to accommodate D2D data transmissions, may send a D2D scheduling grant 210 to notify UE 106 of wireless channel resources that it may use for D2D data transmission. In some embodiments, D2D scheduling grant 210 may comprise information within a control message that eNB 102 sends to UE 106, such as an RRC control message. UE 106 may use information in D2D scheduling grant 210 to identify wireless channel resources for use in D2D transmission of data to UE 108. Prior to performing its D2D data transmission(s) to UE 108, UE 106 may send control information 211 to notify UE 108 of the wireless channel resources allocated for its D2D data transmission(s). UE 106 may then perform D2D transmission of data 213 to UE 108, and UE 108 may receive the data 213 via some or all of the wireless channel resources allocated for D2D data transmission(s) of UE 106.

In various embodiments, UE 106 may have multiple D2D messages to transmit to UE 108, and/or may frequently generate D2D messages for transmission to UE 108. Requiring that D2D scheduling grant 210 specifically identify distinct respective resource sets for each D2D message—or requiring that eNB 102 send separate D2D scheduling grants 210 for each D2D message that UE 106 has to send—may result in an excessive overall overhead associated with notifying UE 106 of the resources that it may use. As such, it may be desirable that D2D scheduling grant 210 identify resources that may be used to accommodate multiple D2D messages, but that it not be required to identify such resources in a D2D message-specific manner. It may also be desirable that D2D scheduling grant 210 be formatted such that it can convey such information while comprising a relatively compact structure. In some embodiments, the format for the control information 211 that UE 106 sends to UE 108 may mirror that of the D2D scheduling grant 210 that eNB 102 sends to UE 106. In such embodiments, the use of a compact, non-message-specific format for D2D scheduling grant 210 may also beneficially reduce overhead associated with transmissions of control information 211 by transmitting D2D UEs, even with respect to control information 211 sent by out-of-coverage transmitting D2D UEs.

Disclosed herein are resource allocation techniques for D2D communications. According to some disclosed techniques, an eNB may be configured to select a D2D data transmission pattern (DTP) that generally specifies subframes or other time intervals during which a D2D UE is permitted to perform D2D transmissions. In various embodiments, the eNB may be configured to notify the D2D UE of the selected DTP by sending a D2D control information (D2DCI) message that comprises information identifying the selected DTP. In some embodiments, the eNB may indicate the selected DTP simply by including a DTP index in the D2DCI message. In various embodiments, the D2D UE may be operative to transmit multiple D2D messages using respective sets of available resources specified by the same DTP index. The embodiments are not limited in this context.

Figure 3:
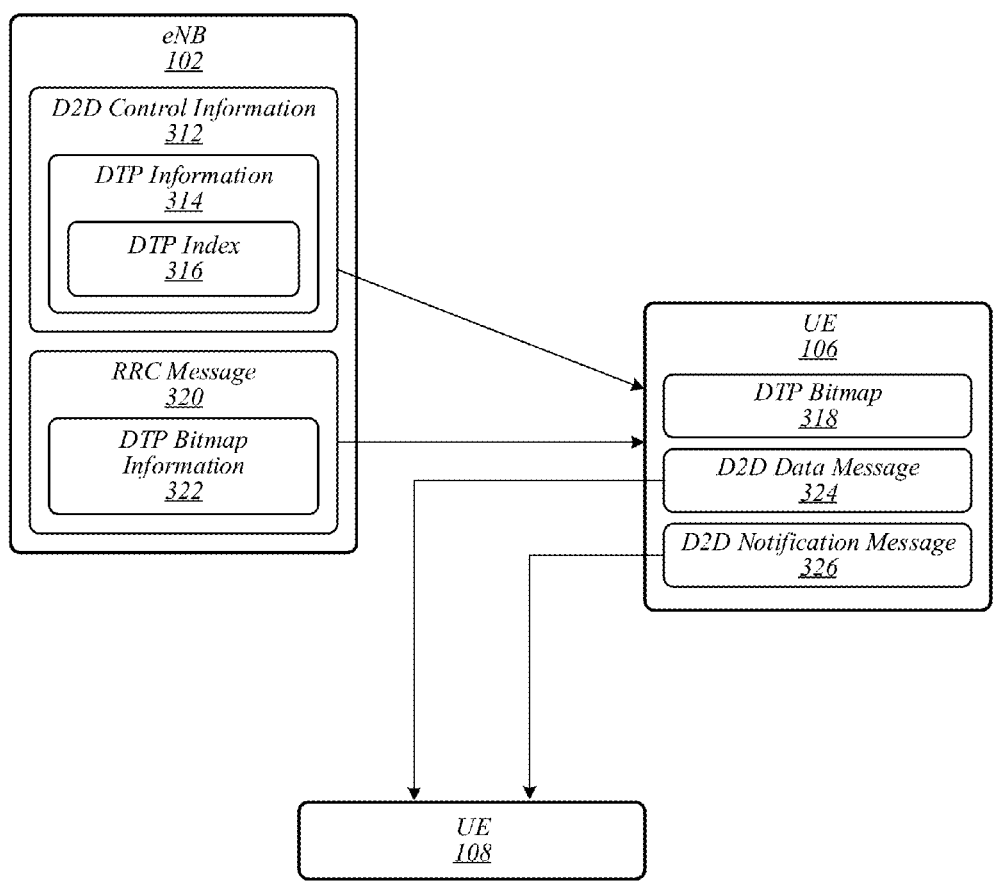
FIG. 3 illustrates an embodiment of a third operating environment.

FIG. 3 illustrates an example of an operating environment 300 in which the disclosed resource allocation techniques for D2D communications may be implemented in some embodiments. In operating environment 300, eNB 102 sends D2D control information 312 to UE 106. In various embodiments, D2D control information 312 may be comprised within one or more information elements (IEs) of a control message, such as an RRC message. In some embodiments, eNB 102 may periodically transmit D2D control information 312 to UE 106. In various embodiments, D2D control information 312 may generally comprise parameters and/or other information to be applied by UE 106 in conjunction with D2D communications. In some embodiments, eNB 102 may be operative to select a DTP for UE 106. In various embodiments, the DTP may generally specify subframes or other time intervals during which UE 106 is permitted to perform D2D transmissions. In some embodiments, eNB 102 may be operative to select the DTP for UE 106 from among a set of defined DTPs.

Figure 4:
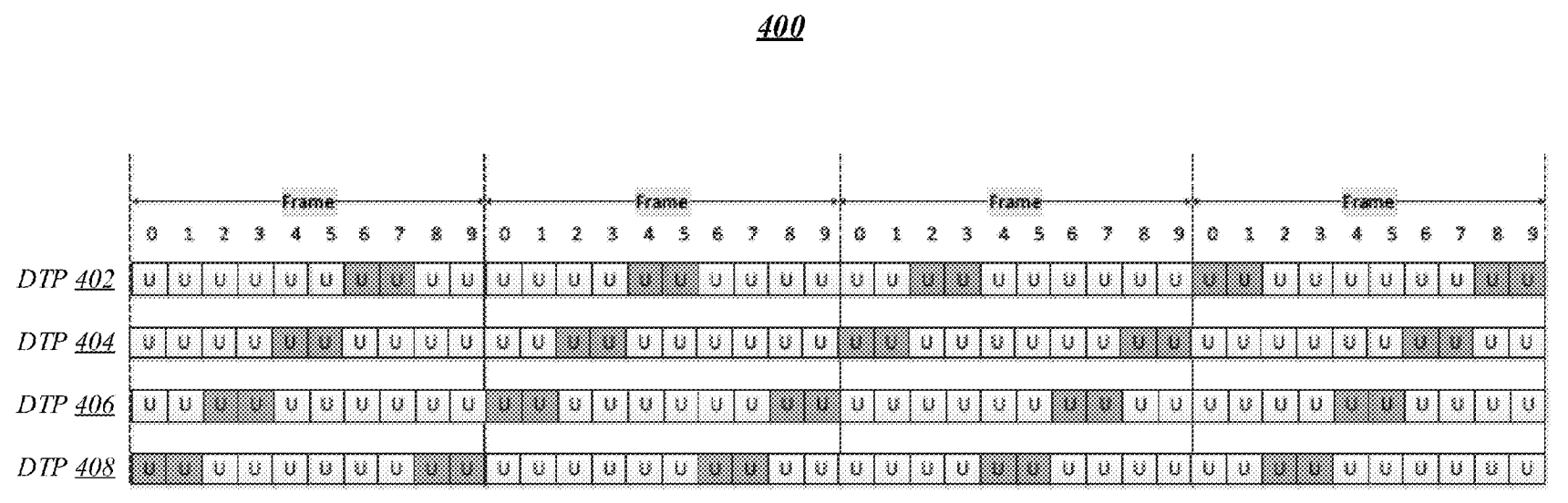

FIG. 4 illustrates an example of a DTP set 400 such as may be representative of a DTP set from among which eNB 102 may select a DTP in various embodiments. In the example of FIG. 4, DTP set 400 comprises DTPs 402, 404, 406, and 408. The subframes that are shaded in each DTP represent the subframes that are allocated for D2D transmissions according to that DTP. With respect to any particular DTP, the term "pattern duration" shall be employed herein to denote the length of that DTP with respect to some time unit or unit that is a proxy for time. In this example, each of DTPs 402, 404, 406, and 408 comprises a pattern duration of forty subframes, or four frames. With respect to any particular DTP, the term "D2D allocation ratio" shall be employed herein to denote the ratio between the amount of time units and/or wireless channel resources that the DTP allocates for D2D transmissions and the amount of time units and/or wireless channel resources that the DTP does not allocate for D2D transmissions over the course of the pattern duration. In this example, each of DTPs 402, 404, 406, and 408 allocates ten subframes for D2D transmissions and does not allocate the remaining thirty subframes for D2D transmissions. As such, each of DTPs 402, 404, 406, and 408 exhibits a D2D allocation ratio of ⅓.

In the example of FIG. 4, although DTPs 402, 404, 406, and 408 feature the same pattern durations and D2D allocation ratios, they are orthogonal in time with respect to their D2D allocations. During any particular subframe, only one of these four DTPs will indicate that D2D transmissions are permitted. In some embodiments, an eNB that selects from among a DTP set may consider such orthogonality when selecting the DTP. For example, eNB 102 of FIG. 3 may select a DTP for UE 106 that is orthogonal in time to a DTP that it has selected for another UE. It is worthy of note that—as reflected by the presence of the letter "U" in each subframe for each DTP therein—DTP set 400 is representative of an FDD configuration, according to which UL transmissions may be performed in every subframe. However, the embodiments are not limited in this context, and the techniques herein may also be implemented in conjunction with FDD configurations.

Figure 5:
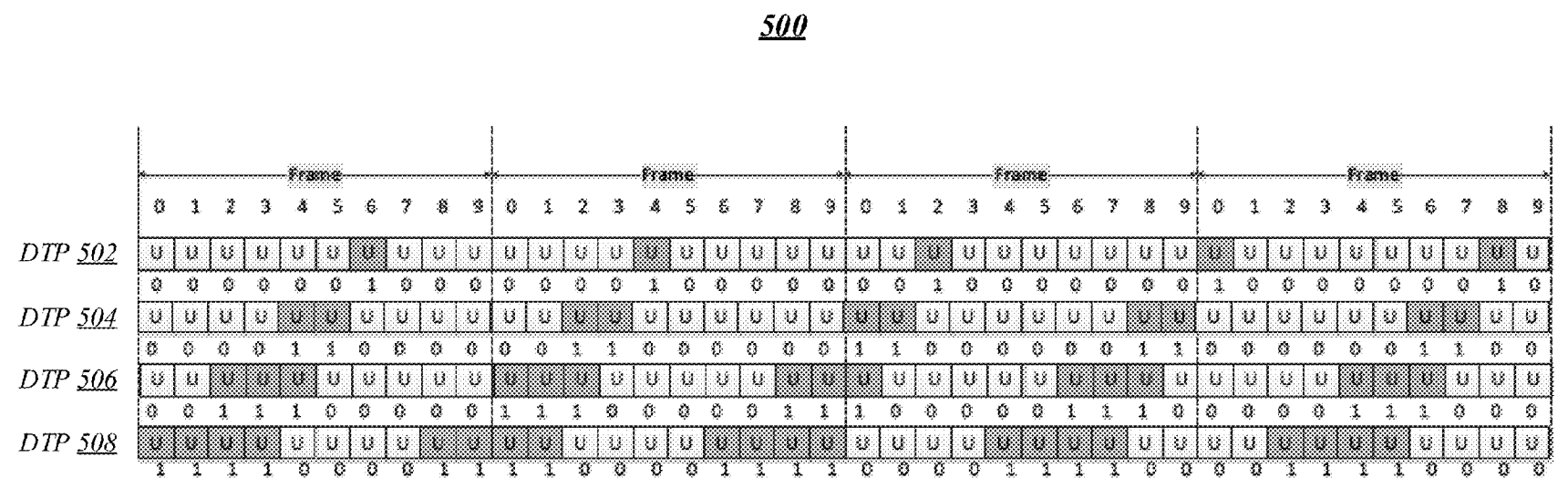

FIG. 5 illustrates an example of a DTP set 500 such as may be representative of a DTP set from among which eNB 102 may select a DTP in various embodiments. In the example of FIG. 5, DTP set 500 comprises DTPs 502, 504, 506, and 508. Like DTPs 402, 404, 406, and 408 of FIG. 4, DTPs 502, 504, 506, and 508 each comprise pattern durations of forty subframes. However, in this example, each of DTPs 502, 504, 506, and 508 features a different D2D allocation ratio. DTP 502 features a D2D allocation ratio of 4/36 (or ⅑), DTP 504 features a D2D allocation ratio of 10/30 (or ⅓), DTP 506 features a D2D allocation ratio of 15/25 (or ⅗), and DTP 508 features a D2D allocation ratio of 20/20 (or 1). Some of DTPs 502, 504, 506, and 508 are orthogonal in time to each other, while others are not. For example, DTPs 502, 504, and 508 are mutually orthogonal in time, and DTP 502 is orthogonal in time to DTP 506, but DTP 506 is not orthogonal in time to either DTP 504 or DTP 508.

In some embodiments, an eNB that selects from among a DTP set such as DTP set 500 may consider a desired D2D data rate for a UE to which the selected DTP is to apply. In various embodiments, for example, the eNB may select a DTP exhibiting a D2D allocation ratio that is appropriate for the desired D2D data rate. For a D2D UE that requires a relatively high D2D data rate, the eNB may select a DTP featuring a relatively high D2D allocation ratio, such as DTP 508. For a D2D UE that does not require more than a minimal D2D data rate, the eNB may select a DTP featuring a relatively low D2D allocation ratio, such as DTP 502. In some embodiments, D2D data rate considerations may be performed in concert with time orthogonality considerations. In an example, an eNB that has selected DTP 504 for a first D2D UE may also need select a DTP for a second D2D UE for which the desired D2D data rate can be achieved via DTP 506. Despite the fact that DTP 506 features a sufficient D2D allocation ratio to meet the needs of the second D2D UE, the eNB may select DTP 508 for the second D2D UE, because DTP 508 is orthogonal in time to DTP 504 while DTP 506 is not. The embodiments are not limited to this example.

It is to be understood that the embodiments are not limited to the numbers of DTPs, pattern durations or underlying time units, D2D allocation ratios, or other DTP set characteristics depicted in FIGS. 4 and 5. In various embodiments, a DTP set may comprise a lesser or greater number of different DTPs, which may or may not be of the same pattern duration or feature the same D2D allocation ratio, and may or may not be defined at a subframe level of granularity. It is again to be appreciated that the disclosed techniques may be implemented in conjunction with TDD configurations, despite the fact that the examples of FIGS. 4 and 5 are representative of FDD configurations. The embodiments are not limited in this context.

Returning to FIG. 3, in some embodiments, eNB 102 may be operative to select the DTP for UE 106 based on a desired D2D data rate for UE 106. In various embodiments, eNB 102 may be operative to select a particular DTP for UE 106 based on a determination that the DTP is orthogonal in time to a DTP that it has selected for another D2D UE. In some embodiments, eNB 102 may be operative to report the selected DTP to UE 106 by sending D2D control information 312 comprising DTP information 314 that specifies the selected DTP. In various embodiments, eNB 102 may select the DTP from among a defined DTP set, and a unique respective DTP index may be associated with each DTP in the set. In some embodiments, each DTP index may comprise a sequence of bits. In an example, the DTP indices for DTPs 402, 404, 406, and 408 of FIG. 4 may be '00', '01', '10', and '11', respectively. In various embodiments, eNB 102 may be operative to select a DTP for UE 106 and identify a DTP index 316 as the DTP index that corresponds to the selected DTP. In some embodiments, eNB 102 may be operative to report the selected DTP to UE 106 by sending D2D control information 312 comprising DTP information 314 that contains the DTP index 316. In various embodiments, eNB 102 may be operative to send D2D control information 312 to UE 106 over a physical downlink control channel (PDCCH). The embodiments are not limited in this context.

In some embodiments, UE 106 may be operative to receive D2D control information 312 and identify a set of D2D transmission resources based on DTP information 314. In various embodiments, UE 106 may identify the selected DTP based on DTP information 314 and identify the set of D2D transmission resources based on the selected DTP. In some embodiments, DTP information 314 may comprise DTP index 316, and UE 106 may be operative to identify the selected DTP based on DTP index 316. In various embodiments, UE 106 may determine a DTP bitmap 318 that corresponds to the DTP indicated by DTP information 314, and may identify the set of D2D transmission resources based on the DTP 318 bitmap. In some embodiments, for a given DTP, a corresponding DTP bitmap may a respective bit for each individual subframe or other time segment for which that DTP specifies whether D2D transmission is permitted. For example, a DTP bitmap 318 that corresponds to DTP 402 of FIG. 4 may comprise forty bits—one for each of the forty subframes comprising the pattern duration of DTP 402.

In various embodiments, based on DTP information 314, UE 106 may retrieve DTP bitmap 318 from among a plurality of DTP bitmaps contained in memory or storage. In some embodiments, from among the plurality of DTP bitmaps in memory or storage, UE 106 may retrieve a DTP bitmap 318 that it determines to be associated with DTP index 316. In various embodiments, UE 106 may be configured with the plurality of DTP bitmaps via RRC signaling from eNB 102. For example, in some embodiments, eNB 102 may configure UE 106 with the plurality of DTP bitmaps by sending an RRC message 320 that comprises DTP bitmap information 322. In various embodiments, DTP bitmap information 322 may be comprised within an information element (IE) of a system information block (SIB) comprised in RRC message 320. In some embodiments, DTP bitmap information 322 may comprise the plurality of DTP bitmaps and information specifying which respective one of a plurality of DTP indices corresponds to each of the plurality of DTP bitmaps. In various other embodiments, rather than being configured with DTP bitmap information 322 via RRC message 320, UE 106 may be configured with DTP bitmap information 322 at the time of initial device provisioning. In yet other embodiments, rather than sending DTP information 314 that comprises DTP index 316, eNB 102 may send DTP information 314 that comprises DTP bitmap 318 itself. The embodiments are not limited in this context.

In some embodiments, UE 106 may be operative to determine a DTP applicability interval for the DTP specified by DTP information 314. With respect to the DTP specified by DTP information 314, or any other particular DTP, the term "DTP applicability interval" is defined to denote the time period during which the selection of that DTP remains in effect, such that it should be used to identify any resources needed for D2D transmissions. In various embodiments, the DTP specified by DTP information 314 may remain in effect at UE 106 until a next D2D control information message is received. In such embodiments, the DTP applicability interval for the DTP specified by DTP information 314 may comprise the time interval between receipt of D2D control information 312 and receipt of that next D2D control information message.

In some embodiments, UE 106 may be operative to use the DTP specified by DTP information 314 to identify D2D transmission resources comprised in the DTP applicability interval. In various embodiments, the pattern duration of the DTP specified by DTP information 314 may differ from the DTP applicability interval of that DTP. In some embodiments, the specified DTP may remain in effect for a period of time that is longer than the pattern duration of the specified DTP. In various embodiments, UE 106 may apply the specified DTP repetitively over time in order to identify D2D transmission resources throughout the DTP applicability interval. For example, UE 106 may apply DTP 402 of FIG. 4, which comprises a pattern length of forty subframes, to each of five forty-subframe subintervals within a DTP applicability interval comprising 200 subframes (twenty frames). The embodiments are not limited to this example.

In some embodiments, UE 106 may be operative to transmit one or more D2D data messages using D2D transmission resources comprised among those identified based on DTP information 314. For example, in various embodiments, UE 106 may be operative to transmit a D2D data message 324 to UE 108 using D2D transmission resources comprised among the identified resources. In some embodiments, UE 106 may be operative to send a D2D notification message 326 to UE 108 to report the D2D transmission resources to be used to send D2D data message 324. In some embodiments, UE 106 may be operative to send D2D notification message 326 to UE 108 over a direct control channel. In various embodiments, D2D notification message 326 may comprise DTP information that is the same as—or similar to—the DTP information 314 received in D2D control information message 312. In some embodiments, D2D notification message may comprise the same DTP information 314 by design, in order to ensure that information regarding D2D transmission resources is communicated in an unambiguous form that is commonly interpreted by any D2D UE. In some embodiments, D2D notification message 326 may comprise a same DTP index 316 as was received in D2D control information message 312. In various embodiments, UE 108 may use the information comprised in D2D notification message 326 to identify the wireless channel resource via which to properly receive D2D data message 324. The embodiments are not limited in this context.

In some embodiments, D2D control information 312 may also comprise information describing a pattern or other configuration for D2D retransmissions. In various embodiments, D2D control information 312 may identify a maximum number of retransmissions to be performed for D2D messages. For example, in some embodiments, D2D control information 312 may indicate that a maximum of three retransmissions may be performed for a given D2D transmission. In various embodiments, D2D control information 312 may comprise information describing a relationship between D2D transmission resources and D2D retransmission resources. In some embodiments, for example, D2D control information 312 may comprise information usable to determine—given the subframe(s) during which a D2D message was transmitted—the subframe(s) during which a retransmission of that D2D message should be performed. The embodiments are not limited to this example.

It is worthy of note that in various embodiments, the techniques described herein may be adapted for use in conjunction with other RRC operations in D2D environments. For example, with respect to a wireless network in which D2D subframes are configured, various D2D subframe channels, such as one or more of a D2D data channel, a D2D discovery channel, a D2D control channel, and/or another type of D2D channel could be defined in analogous fashion as the DTPs discussed above, using repeated bitmap patterns. Likewise, the aforementioned DTP bitmaps could be adapted for use as D2D subframe bitmaps, and D2D subframe pattern indices could be defined for use, via RRC signaling, to identify D2D subframe configurations that are selected and/or applied. In various embodiments, the aforementioned DTP indices and/or DTP bitmaps could be used to specify patterns within pre-allocated pools of resources for D2D operations. In some embodiments, DTP bitmaps could be used to directly specify resources on a multiple frame basis in a fashion similar to a defined mechanism of channel state information (CSI) subframe pattern configuration. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 6:
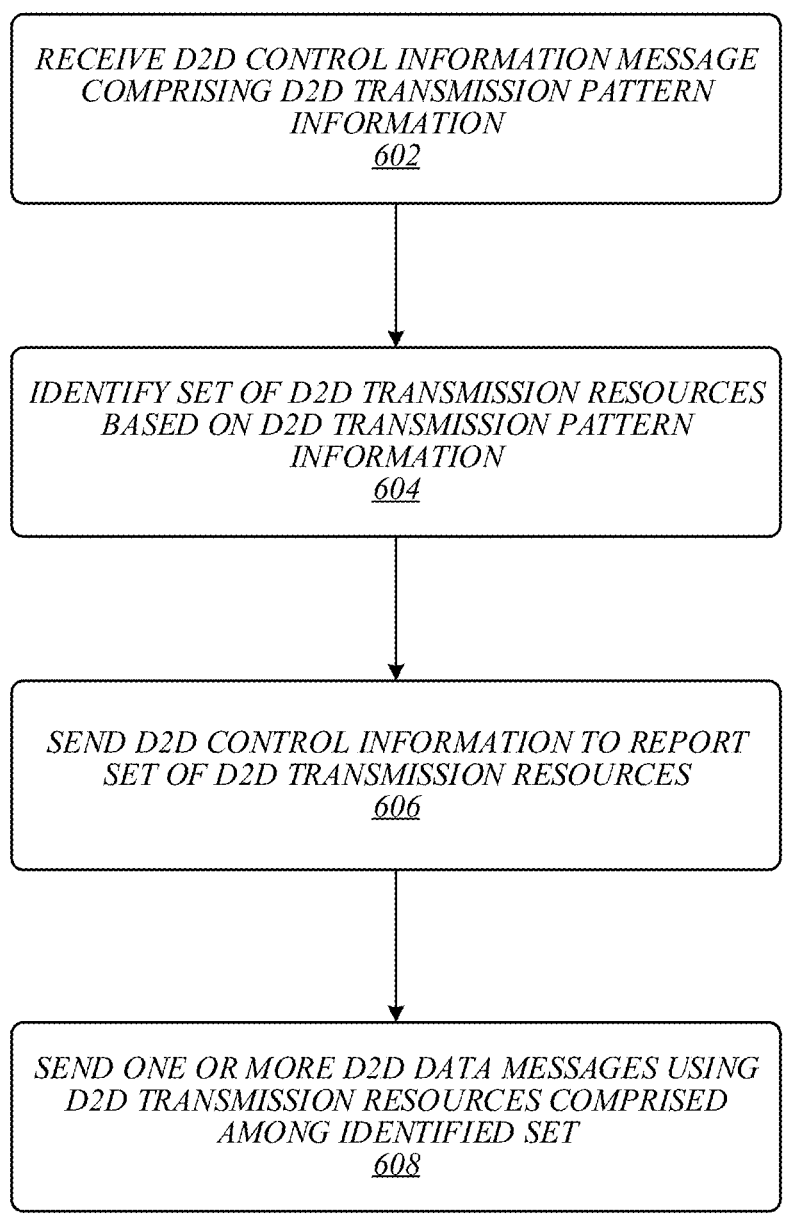
FIG. 6 illustrates an embodiment of a first logic flow.

FIG. 6 illustrates one embodiment of a logic flow 600 such as may be representative of operations that may be performed in some embodiments by UE 106. As shown in FIG. 6, a D2D control information message may be received at 602 that comprises D2D transmission pattern information. For example, UE 106 may be operative to receive D2D control information 312 from eNB 102 that comprises DTP information 314. At 604, a set of D2D transmission resources may be identified based on the D2D transmission pattern information. For example, UE 106 may be operative to identify a set of D2D transmission resources based on a DTP index 316 comprised in DTP information 314. At 606, D2D control information may be sent to report the set of D2D transmission resources. For example, UE 106 may be operative to send D2D notification message 326 to report the identified set of D2D transmission resources to UE 108. At 608, one or more D2D data messages may be sent using D2D transmission resources comprised among the identified set of D2D transmission resources. For example, UE 106 may be operative to send one or more D2D data messages 324 to UE 108 using D2D transmission resources comprised among those it has identified based on DTP index 316. The embodiments are not limited to these examples.

It is worthy of note that in some embodiments, a D2D UE performing operations of logic flow 600 may operate in an autonomous mode according to which it selects the DTP itself. In such embodiments, rather than performing operations 602 and 604, the D2D UE may select the DTP and then proceed directly to 606, where it may send D2D control information comprising the a DTP index for the selected DTP. The embodiments are not limited in this context.

FIG. 7 illustrates one embodiment of a logic flow 700 such as may be representative of operations that may be performed in various embodiments by eNB 102. As shown in FIG. 7, a D2D transmission pattern may be selected at 702 from among a plurality of defined D2D transmission patterns. For example, eNB 102 may be operative to select a D2D transmission pattern from among a plurality of defined D2D transmission patterns. At 704, a DTP index for the selected D2D transmission pattern may be identified. For example, eNB 102 may be operative to identify a DTP index 316 for a D2D transmission pattern that it has selected. At 706, the selected D2D transmission pattern may be reported by sending D2D control information comprising the D2D index. For example, eNB 102 may be operative to report a D2D transmission pattern that it has selected by sending DTP information 314 comprising the DTP index 316 for the selected D2D transmission pattern. The embodiments are not limited to these examples.

FIG. 8A illustrates an embodiment of a storage medium 800. Storage medium 800 may comprise any non-transitory computer-readable storage medium or machine-readable storage medium, such as an optical, magnetic or semiconductor storage medium. In various embodiments, storage medium 800 may comprise an article of manufacture. In some embodiments, storage medium 800 may store computer-executable instructions, such as computer-executable instructions to implement logic flow 600 of FIG. 6. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

FIG. 8B illustrates an embodiment of a storage medium 850. Storage medium 850 may comprise any non-transitory computer-readable storage medium or machine-readable storage medium, such as an optical, magnetic or semiconductor storage medium. In various embodiments, storage medium 850 may comprise an article of manufacture. In some embodiments, storage medium 850 may store computer-executable instructions, such as computer-executable instructions to implement logic flow 700 of FIG. 7. Examples of a computer-readable/machine-readable storage medium and of computer-executable instructions may include—without limitation—any of the respective examples mentioned above in reference to storage medium 800 of FIG. 8A. The embodiments are not limited in this context.

FIG. 9 illustrates an embodiment of a communications device 900 that may implement one or more of eNB 102, UE 106, UE 108, logic flow 600 of FIG. 6, logic flow 700 of FIG. 7, storage medium 800 of FIG. 8A, and storage medium 850 of FIG. 8B. In various embodiments, device 900 may comprise a logic circuit 928. The logic circuit 928 may include physical circuits to perform operations described for one or more of eNB 102, UE 106, UE 108, logic flow 600 of FIG. 6, and logic flow 700 of FIG. 7, for example. As shown in FIG. 9, device 900 may include a radio interface 910, baseband circuitry 920, and computing platform 930, although the embodiments are not limited to this configuration.

The device 900 may implement some or all of the structure and/or operations for one or more of eNB 102, UE 106, UE 108, logic flow 600 of FIG. 6, logic flow 700 of FIG. 7, storage medium 800 of FIG. 8A, storage medium 850 of FIG. 8B, and logic circuit 928 in a single computing entity, such as entirely within a single device. Alternatively, the device 900 may distribute portions of the structure and/or operations for one or more of eNB 102, UE 106, UE 108, logic flow 600 of FIG. 6, logic flow 700 of FIG. 7, storage medium 800 of FIG. 8A, storage medium 850 of FIG. 8B, and logic circuit 928 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 910 may include a component or combination of components adapted for transmitting and/or receiving single-carrier or multi-carrier modulated signals (e.g., including complementary code keying (CCK), orthogonal frequency division multiplexing (OFDM), and/or single-carrier frequency division multiple access (SC-FDMA) symbols) although the embodiments are not limited to any specific over-the-air interface or modulation scheme. Radio interface 910 may include, for example, a receiver 912, a frequency synthesizer 914, and/or a transmitter 916. Radio interface 910 may include bias controls, a crystal oscillator and/or one or more antennas 918-f. In another embodiment, radio interface 910 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 920 may communicate with radio interface 910 to process receive and/or transmit signals and may include, for example, an analog-to-digital converter 922 for down converting received signals, a digital-to-analog converter 924 for up converting signals for transmission. Further, baseband circuitry 920 may include a baseband or physical layer (PHY) processing circuit 926 for PHY link layer processing of respective receive/transmit signals. Baseband circuitry 920 may include, for example, a medium access control (MAC) processing circuit 927 for MAC/data link layer processing. Baseband circuitry 920 may include a memory controller 932 for communicating with MAC processing circuit 927 and/or a computing platform 930, for example, via one or more interfaces 934.

In some embodiments, PHY processing circuit 926 may include a frame construction and/or detection module, in combination with additional circuitry such as a buffer memory, to construct and/or deconstruct communication frames. Alternatively or in addition, MAC processing circuit 927 may share processing for certain of these functions or perform these processes independent of PHY processing circuit 926. In some embodiments, MAC and PHY processing may be integrated into a single circuit.

The computing platform 930 may provide computing functionality for the device 900. As shown, the computing platform 930 may include a processing component 940. In addition to, or alternatively of, the baseband circuitry 920, the device 900 may execute processing operations or logic for one or more of eNB 102, UE 106, UE 108, logic flow 600 of FIG. 6, logic flow 700 of FIG. 7, storage medium 800 of FIG. 8A, storage medium 850 of FIG. 8B, and logic circuit 928 using the processing component 940. The processing component 940 (and/or PHY 926 and/or MAC 927) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 930 may further include other platform components 950. Other platform components 950 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 900 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 900 described herein, may be included or omitted in various embodiments of device 900, as suitably desired.

Embodiments of device 900 may be implemented using single input single output (SISO) architectures. However, certain implementations may include multiple antennas (e.g., antennas 918-*f*) for transmission and/or reception using adaptive antenna techniques for beamforming or spatial division multiple access (SDMA) and/or using MIMO communication techniques.

The components and features of device 900 may be implemented using any combination of discrete circuitry, application specific integrated circuits (ASICs), logic gates and/or single chip architectures. Further, the features of device 900 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 900 shown in the block diagram of FIG. 9 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 10:
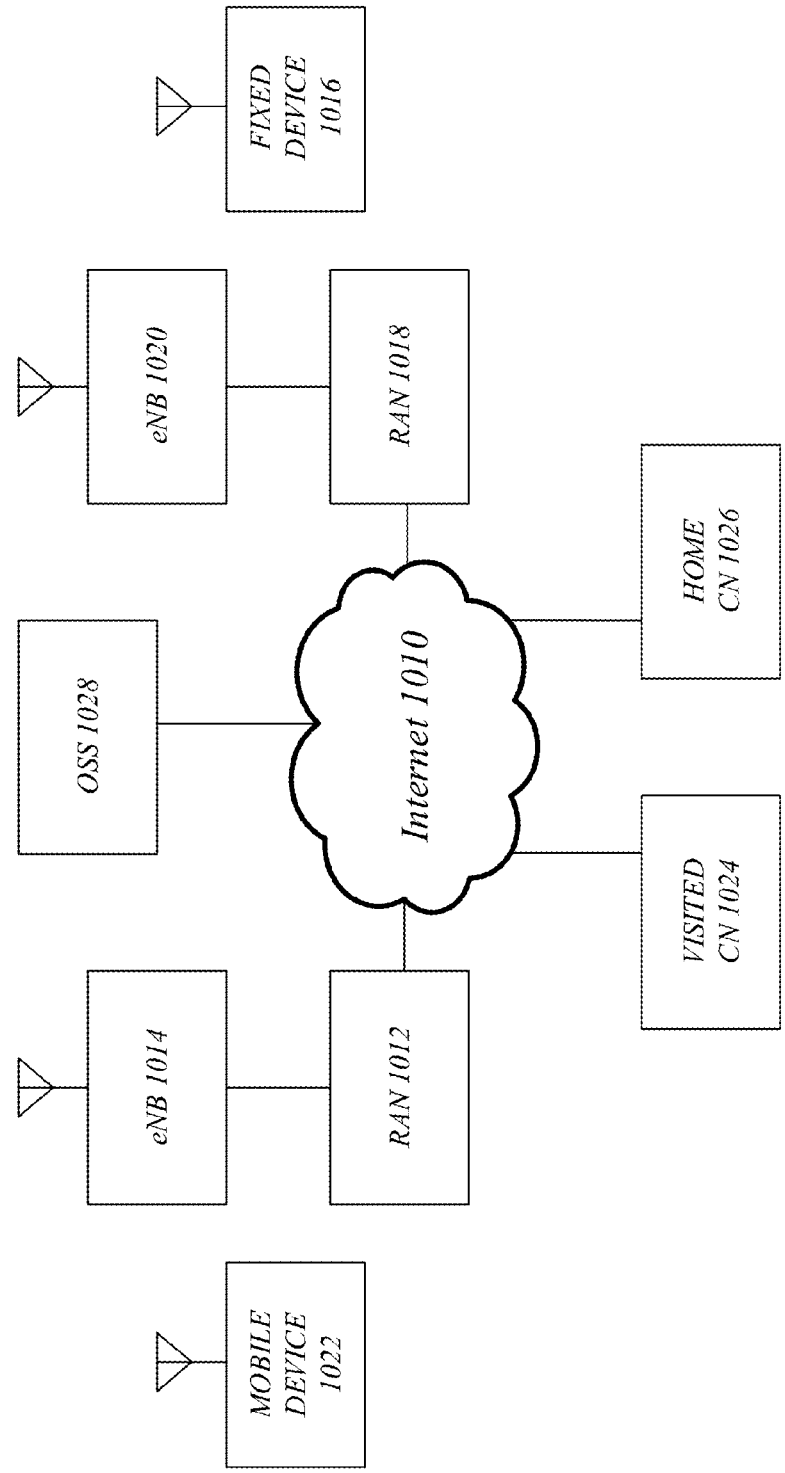
FIG. 10 illustrates an embodiment of a wireless network.

FIG. 10 illustrates an embodiment of a broadband wireless access system 1000. As shown in FIG. 10, broadband wireless access system 1000 may be an internet protocol (IP) type network comprising an internet 1010 type network or the like that is capable of supporting mobile wireless access and/or fixed wireless access to internet 1010. In one or more embodiments, broadband wireless access system 1000 may comprise any type of orthogonal frequency division multiple access (OFDMA)-based or single-carrier frequency division multiple access (SC-FDMA)-based wireless network, such as a system compliant with one or more of the 3GPP LTE Specifications and/or IEEE 802.16 Standards, and the scope of the claimed subject matter is not limited in these respects.

In the exemplary broadband wireless access system 1000, radio access networks (RANs) 1012 and 1018 are capable of coupling with evolved node Bs (eNBs) 1014 and 1020, respectively, to provide wireless communication between one or more fixed devices 1016 and internet 1010 and/or between or one or more mobile devices 1022 and Internet 1010. One example of a fixed device 1016 and a mobile device 1022 is device 900 of FIG. 9, with the fixed device 1016 comprising a stationary version of device 900 and the mobile device 1022 comprising a mobile version of device 900. RANs 1012 and 1018 may implement profiles that are capable of defining the mapping of network functions to one or more physical entities on broadband wireless access system 1000. eNBs 1014 and 1020 may comprise radio equipment to provide RF communication with fixed device 1016 and/or mobile device 1022, such as described with reference to device 900, and may comprise, for example, the PHY and MAC layer equipment in compliance with a 3GPP LTE Specification or an IEEE 802.16 Standard. eNBs 1014 and 1020 may further comprise an IP backplane to couple to Internet 1010 via RANs 1012 and 1018, respectively, although the scope of the claimed subject matter is not limited in these respects.

Broadband wireless access system 1000 may further comprise a visited core network (CN) 1024 and/or a home CN 1026, each of which may be capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CN 1024 and/or home CN 1026, and the scope of the claimed subject matter is not limited in these respects. Visited CN 1024 may be referred to as a visited CN in the case where visited CN 1024 is not part of the regular service provider of fixed device 1016 or mobile device 1022, for example where fixed device 1016 or mobile device 1022 is roaming away from its respective home CN 1026, or where broadband wireless access system 1000 is part of the regular service provider of fixed device 1016 or mobile device 1022 but where broadband wireless access system 1000 may be in another location or state that is not the main or home location of fixed device 1016 or mobile device 1022. The embodiments are not limited in this context.

Fixed device 1016 may be located anywhere within range of one or both of eNBs 1014 and 1020, such as in or near a home or business to provide home or business customer broadband access to Internet 1010 via eNBs 1014 and 1020 and RANs 1012 and 1018, respectively, and home CN 1026. It is worthy of note that although fixed device 1016 is generally disposed in a stationary location, it may be moved to different locations as needed. Mobile device 1022 may be utilized at one or more locations if mobile device 1022 is within range of one or both of eNBs 1014 and 1020, for example. In accordance with one or more embodiments, operation support system (OSS) 1028 may be part of broadband wireless access system 1000 to provide management functions for broadband wireless access system 1000 and to provide interfaces between functional entities of broadband wireless access system 1000. Broadband wireless access system 1000 of FIG. 10 is merely one type of wireless network showing a certain number of the components of broadband wireless access system 1000, and the scope of the claimed subject matter is not limited in these respects.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is user equipment (UE), comprising: logic, at least a portion of which is in hardware, the logic to receive a device-to-device (D2D) control information (D2DCI) message comprising D2D transmission pattern (DTP) information, identify a set of D2D transmission resources based on the DTP information, and send one or more D2D data messages using D2D transmission resources comprised among the set of D2D transmission resources.

Example 2 is the UE of Example 1, the logic to send a D2D notification message over a direct control channel to report the DTP control information.

Example 3 is the UE of Example 1, the logic to identify a DTP based on the DTP information and identify the set of D2D transmission resources based on the DTP.

Example 4 is the UE of Example 3, the logic to identify the DTP based on a DTP index associated with the DTP, the DTP index to be comprised in the DTP information.

Example 5 is the UE of Example 3, the logic to use the DTP to identify, from among a plurality of subframes comprised in a frame, one or more subframes during which the UE is permitted to perform D2D transmission.

Example 6 is the UE of Example 3, the DTP to comprise a pattern duration of multiple subframes.

Example 7 is the UE of Example 3, the logic to use the DTP to identify D2D transmission resources comprised within a DTP applicability interval comprising a duration that exceeds a pattern duration of the DTP.

Example 8 is the UE of Example 7, the DTP applicability interval to comprise an interval between receipt of the D2DCI message and a receipt of a second D2DCI message.

Example 9 is the UE of Example 1, the logic to identify the set of D2D transmission resources from among a pre-allocated D2D subframe pool, based on the DTP information.

Example 10 is the UE of Example 1, comprising: at least one radio frequency (RF) transceiver; and at least one RF antenna.

Example 11 is the UE of Example 10, comprising a touchscreen display.

Example 12 is an evolved node B (eNB), comprising: logic, at least a portion of which is in hardware, the logic to select a device-to-device transmission pattern (DTP) for a user equipment (UE) from among a plurality of defined DTPs, identify a DTP index for the selected DTP, and report the selected DTP by sending device-to-device (D2D) control information comprising the DTP index.

Example 13 is the eNB of Example 12, the logic to send the D2D control information over a physical downlink control channel (PDCCH).

Example 14 is the eNB of Example 12, the plurality of defined DTPs comprising at least one DTP that embodies a different D2D allocation ratio than the selected DTP.

Example 15 is the eNB of Example 12, the logic to select the DTP based on a desired D2D data rate for the UE.

Example 16 is the eNB of Example 12, the logic to select the DTP based on a determination that the DTP is orthogonal in time to a DTP selected for a second UE.

Example 17 is the eNB of Example 12, the logic to send a radio resource control (RRC) message comprising a DTP bitmap for the DTP.

Example 18 is the eNB of Example 17, the RRC message to comprise a system information block (SIB) containing an information element (IE) that comprises the DTP subframe bitmap.

Example 19 is the eNB of Example 12, the selected DTP to comprise a multi-frame pattern duration.

Example 20 is the eNB of Example 12, comprising: one or more radio frequency (RF) transceivers; and one or more RF antennas.

Example 21 is at least one non-transitory computer-readable storage medium comprising a set of instructions that, in response to being executed on user equipment (UE), cause the UE to: receive a device-to-device (D2D) control information (D2DCI) message comprising a D2D transmission pattern (DTP) index; identify a set of wireless channel resources based on the DTP index; send a D2D notification message to report the DTP index; and send one or more D2D messages using wireless channel resources comprised among the set of wireless channel resources.

Example 22 is the at least one non-transitory computer-readable storage medium of Example 21, comprising instructions that, in response to being executed on the UE, cause the UE to: identify a DTP based on the DTP index; and identify the set of wireless channel resources based on the DTP.

Example 23 is the at least one non-transitory computer-readable storage medium of Example 22, comprising instructions that, in response to being executed on the UE, cause the UE to: retrieve a DTP subframe bitmap associated with the DTP index; and identify the set of wireless channel resources based on the DTP subframe bitmap.

Example 24 is the at least one non-transitory computer-readable storage medium of Example 23, comprising instructions that, in response to being executed on the UE, cause the UE to use the DTP subframe bitmap to identify, from among a plurality of subframes comprised in one or more frames, one or more subframes during which the UE is permitted to perform D2D transmission.

Example 25 is the at least one non-transitory computer-readable storage medium of Example 22, the DTP to comprise a pattern duration of multiple frames.

Example 26 is the at least one non-transitory computer-readable storage medium of Example 22, comprising instructions that, in response to being executed on the UE, cause the UE to use the DTP to identify wireless channel resources comprised within a DTP applicability interval comprising a duration that exceeds a pattern duration of the DTP.

Example 27 is the at least one non-transitory computer-readable storage medium of Example 26, the DTP applicability interval to comprise an interval between receipt of the D2DCI message and a receipt of a second D2DCI message.

Example 28 is the at least one non-transitory computer-readable storage medium of Example 21, comprising instructions that, in response to being executed on the UE, cause the UE to send the D2D notification message over a direct control channel.

Example 29 is a wireless communication method, comprising: selecting, by processing circuitry at an evolved node B (eNB), a device-to-device transmission pattern (DTP) for a user equipment (UE) from among a plurality of defined DTPs; identifying a DTP index for the selected DTP; and reporting the selected DTP by sending device-to-device (D2D) control information comprising the DTP index.

Example 30 is the wireless communication method of Example 29, comprising sending the D2D control information over a physical downlink control channel (PDCCH).

Example 31 is the wireless communication method of Example 29, the plurality of defined DTPs comprising at least one DTP that embodies a different D2D allocation ratio than the selected DTP.

Example 32 is the wireless communication method of Example 29, comprising selecting the DTP based on a desired D2D data rate for the UE.

Example 33 is the wireless communication method of Example 29, comprising selecting the DTP based on a determination that the DTP is orthogonal in time to a DTP selected for a second UE.

Example 34 is the wireless communication method of Example 29, comprising sending a radio resource control (RRC) message comprising a DTP bitmap for the DTP.

Example 35 is the wireless communication method of Example 34, the RRC message to comprise a system information block (SIB) containing an information element (IE) that comprises the DTP subframe bitmap.

Example 36 is the wireless communication method of Example 29, the selected DTP to comprise a multi-frame pattern duration.

Example 37 is at least one non-transitory computer-readable storage medium comprising a set of instructions that, in response to being executed on a computing device, cause the computing device to perform a wireless communication method according to any of Examples 29 to 36.

Example 38 is an apparatus, comprising means for performing a wireless communication method according to any of Examples 29 to 36.

Example 39 is a system, comprising: an apparatus according to Example 38; at least one radio frequency (RF) transceiver; and at least one RF antenna.

Example 40 is the system of Example 39, comprising at least one memory unit.

Example 41 is a wireless communication method, comprising: receiving, at user equipment (UE), a device-to-device (D2D) control information (D2DCI) message comprising a D2D transmission pattern (DTP) index; identifying, by processing circuitry of the UE, a set of wireless channel resources based on the DTP index; sending a D2D notification message to report the DTP index; and sending one or more D2D messages using wireless channel resources comprised among the set of wireless channel resources.

Example 42 is the wireless communication method of Example 41, comprising: identifying a DTP based on the DTP index; and identifying the set of wireless channel resources based on the DTP.

Example 43 is the wireless communication method of Example 42, comprising: retrieving a DTP subframe bitmap associated with the DTP index; and identifying the set of wireless channel resources based on the DTP subframe bitmap.

Example 44 is the wireless communication method of Example 43, comprising using the DTP subframe bitmap to identify, from among a plurality of subframes comprised in one or more frames, one or more subframes during which the UE is permitted to perform D2D transmission.

Example 45 is the wireless communication method of Example 42, the DTP to comprise a pattern duration of multiple frames.

Example 46 is the wireless communication method of Example 42, comprising using the DTP to identify wireless channel resources comprised within a DTP applicability interval comprising a duration that exceeds a pattern duration of the DTP.

Example 47 is the wireless communication method of Example 46, the DTP applicability interval to comprise an interval between receipt of the D2DCI message and a receipt of a second D2DCI message.

Example 48 is the wireless communication method of Example 41, comprising sending the D2D notification message over a direct control channel.

Example 49 is at least one non-transitory computer-readable storage medium comprising a set of instructions that, in response to being executed on a computing device, cause the computing device to perform a wireless communication method according to any of Examples 41 to 48.

Example 50 is an apparatus, comprising means for performing a wireless communication method according to any of Examples 41 to 48.

Example 51 is a system, comprising: an apparatus according to Example 50; at least one radio frequency (RF) transceiver; and at least one RF antenna.

Example 52 is the system of Example 50, comprising a touchscreen display.

Example 53 is at least one non-transitory computer-readable storage medium comprising a set of wireless communication instructions that, in response to being executed on user equipment (UE), cause the UE to: receive a device-to-device (D2D) control information (D2DCI) message comprising D2D transmission pattern (DTP) information; identify a set of D2D transmission resources based on the DTP information; and send one or more D2D data messages using D2D transmission resources comprised among the set of D2D transmission resources.

Example 54 is the at least one non-transitory computer-readable storage medium of Example 53, comprising wireless communication instructions that, in response to being executed on the UE, cause the UE to send a D2D notification message over a direct control channel to report the DTP control information.

Example 55 is the at least one non-transitory computer-readable storage medium of Example 53, comprising wireless communication instructions that, in response to being executed on the UE, cause the UE to: identify a DTP based on the DTP information; and identify the set of D2D transmission resources based on the DTP.

Example 56 is the at least one non-transitory computer-readable storage medium of Example 55, comprising wireless communication instructions that, in response to being executed on the UE, cause the UE to identify the DTP based on a DTP index associated with the DTP, the DTP index to be comprised in the DTP information.

Example 57 is the at least one non-transitory computer-readable storage medium of Example 55, comprising wireless communication instructions that, in response to being executed on the UE, cause the UE to use the DTP to identify, from among a plurality of subframes comprised in a frame, one or more subframes during which the UE is permitted to perform D2D transmission.

Example 58 is the at least one non-transitory computer-readable storage medium of Example 55, the DTP to comprise a pattern duration of multiple subframes.

Example 59 is the at least one non-transitory computer-readable storage medium of Example 55, comprising wireless communication instructions that, in response to being executed on the UE, cause the UE to use the DTP to identify D2D transmission resources comprised within a DTP applicability interval comprising a duration that exceeds a pattern duration of the DTP.

Example 60 is the at least one non-transitory computer-readable storage medium of Example 59, the DTP applicability interval to comprise an interval between receipt of the D2DCI message and a receipt of a second D2DCI message.

Example 61 is the at least one non-transitory computer-readable storage medium of Example 53, comprising wireless communication instructions that, in response to being executed on the UE, cause the UE to identify the set of D2D transmission resources from among a pre-allocated D2D subframe pool, based on the DTP information.

Example 62 is user equipment (UE), comprising: logic, at least a portion of which is in hardware, the logic to receive a device-to-device (D2D) control information (D2DCI) message comprising a D2D transmission pattern (DTP) index, identify a set of wireless channel resources based on the DTP index, send a D2D notification message to report the DTP index, and send one or more D2D messages using wireless channel resources comprised among the set of wireless channel resources.

Example 63 is the UE of Example 62, the logic to identify a DTP based on the DTP index and identify the set of wireless channel resources based on the DTP.

Example 64 is the UE of Example 63, the logic to retrieve a DTP subframe bitmap associated with the DTP index and identify the set of wireless channel resources based on the DTP subframe bitmap.

Example 65 is the UE of Example 64, the logic to use the DTP subframe bitmap to identify, from among a plurality of subframes comprised in one or more frames, one or more subframes during which the UE is permitted to perform D2D transmission.

Example 66 is the UE of Example 63, the DTP to comprise a pattern duration of multiple frames.

Example 67 is the UE of Example 63, the logic to use the DTP to identify wireless channel resources comprised within a DTP applicability interval comprising a duration that exceeds a pattern duration of the DTP.

Example 68 is the UE of Example 67, the DTP applicability interval to comprise an interval between receipt of the D2DCI message and a receipt of a second D2DCI message.

Example 69 is the UE of Example 62, the logic to send the D2D notification message over a direct control channel.

Example 70 is the UE of any of Examples 62 to 69, comprising: at least one radio frequency (RF) transceiver; and at least one RF antenna.

Example 71 is the UE of Example 70, comprising a touchscreen display.

Example 72 is a wireless communication method, comprising: receiving, at user equipment (UE), a device-to-device (D2D) control information (D2DCI) message comprising D2D transmission pattern (DTP) information; identifying, by processing circuitry of the UE, a set of D2D transmission resources based on the DTP information; and sending one or more D2D data messages using D2D transmission resources comprised among the set of D2D transmission resources.

Example 73 is the wireless communication method of Example 72, comprising sending a D2D notification message over a direct control channel to report the DTP control information.

Example 74 is the wireless communication method of Example 72, comprising: identifying a DTP based on the DTP information; and identifying the set of D2D transmission resources based on the DTP.

Example 75 is the wireless communication method of Example 74, comprising identifying the DTP based on a DTP index associated with the DTP, the DTP index to be comprised in the DTP information.

Example 76 is the wireless communication method of Example 74, comprising using the DTP to identify, from among a plurality of subframes comprised in a frame, one or more subframes during which the UE is permitted to perform D2D transmission.

Example 77 is the wireless communication method of Example 74, the DTP to comprise a pattern duration of multiple subframes.

Example 78 is the wireless communication method of Example 74, comprising using the DTP to identify D2D transmission resources comprised within a DTP applicability interval comprising a duration that exceeds a pattern duration of the DTP.

Example 79 is the wireless communication method of Example 78, the DTP applicability interval to comprise an interval between receipt of the D2DCI message and a receipt of a second D2DCI message.

Example 80 is the wireless communication method of Example 72, comprising identifying the set of D2D transmission resources from among a pre-allocated D2D subframe pool, based on the DTP information.

Example 81 is at least one non-transitory computer-readable storage medium comprising a set of instructions that, in response to being executed on a computing device, cause the computing device to perform a wireless communication method according to any of Examples 72 to 80.

Example 82 is an apparatus, comprising means for performing a wireless communication method according to any of Examples 72 to 80.

Example 83 is a system, comprising: an apparatus according to Example 82; at least one radio frequency (RF) transceiver; and at least one RF antenna.

Example 84 is the system of Example 83, comprising a touchscreen display.

Example 85 is at least one non-transitory computer-readable storage medium comprising a set of instructions that, in response to being executed at an evolved node B (eNB), cause the eNB to: select a device-to-device transmission pattern (DTP) for a user equipment (UE) from among a plurality of defined DTPs; identify a DTP index for the selected DTP; and report the selected DTP by sending device-to-device (D2D) control information comprising the DTP index.

Example 86 is the at least one non-transitory computer-readable storage medium of Example 85, comprising instructions that, in response to being executed at the eNB, cause the eNB to send the D2D control information over a physical downlink control channel (PDCCH).

Example 87 is the at least one non-transitory computer-readable storage medium of Example 85, the plurality of defined DTPs comprising at least one DTP that embodies a different D2D allocation ratio than the selected DTP.

Example 88 is the at least one non-transitory computer-readable storage medium of Example 85, comprising instructions that, in response to being executed at the eNB, cause the eNB to select the DTP based on a desired D2D data rate for the UE.

Example 89 is the at least one non-transitory computer-readable storage medium of Example 85, comprising instructions that, in response to being executed at the eNB, cause the eNB to select the DTP based on a determination that the DTP is orthogonal in time to a DTP selected for a second UE.

Example 90 is the at least one non-transitory computer-readable storage medium of Example 85, comprising instructions that, in response to being executed at the eNB, cause the eNB to send a radio resource control (RRC) message comprising a DTP bitmap for the DTP.

Example 91 is the at least one non-transitory computer-readable storage medium of Example 90, the RRC message to comprise a system information block (SIB) containing an information element (IE) that comprises the DTP subframe bitmap.

Example 92 is the at least one non-transitory computer-readable storage medium of Example 85, the selected DTP to comprise a multi-frame pattern duration.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. An apparatus, comprising:
a memory controller; and
baseband circuitry coupled to the memory controller, the baseband circuitry to:
identify a device-to-device (D2D) subframe pool comprising a plurality of subframes;

identify a resource pattern index based on D2D control information received from a remote device via a wireless control channel;

based on the resource pattern index, identify among the plurality of subframes of the D2D subframe pool a set of subframes comprising D2D transmission resources; and construct a D2D data frame for transmission using D2D transmission resources of the identified set of subframes.

2. The apparatus of claim 1, the baseband circuitry to identify the D2D subframe pool based on a D2D subframe bitmap.

3. The apparatus of claim 2, the D2D subframe bitmap to be comprised in a received radio resource control (RRC) message.

4. The apparatus of claim 2, the D2D subframe bitmap to be comprised in a received system information block.

5. The apparatus of claim 2, an applicability interval of the D2D subframe bitmap to exceed a pattern duration of the D2D subframe bitmap.

6. The apparatus of claim 1, the wireless control channel to comprise a physical downlink control channel (PDCCH).

7. The apparatus of claim 1, the wireless control channel to comprise a D2D control channel.

8. The apparatus of claim 1, the baseband circuitry to:
determine a resource pattern bitmap corresponding to the resource pattern index; and
identify the set of subframes comprising D2D transmission resources based on the resource pattern bitmap.

9. The apparatus of claim 1, comprising a radio interface coupled to the baseband circuitry.

10. At least one non-transitory computer-readable storage medium comprising a set of instructions that, in response to being executed at user equipment (UE), cause the UE to:
identify a device-to-device (D2D) subframe pool comprising a plurality of subframes;
identify a resource pattern index based on D2D control information received from a remote device via a wireless control channel;
based on the resource pattern index, identify among the plurality of subframes of the D2D subframe pool a set of subframes comprising D2D transmission resources; and
construct a D2D data frame for transmission using D2D transmission resources of the identified set of subframes.

11. The at least one non-transitory computer-readable storage medium of claim 10, comprising instructions that, in response to being executed at the UE, cause the UE to identify the D2D subframe pool based on a D2D subframe bitmap.

12. The at least one non-transitory computer-readable storage medium of claim 11, the D2D subframe bitmap to be comprised in a received radio resource control (RRC) message.

13. The at least one non-transitory computer-readable storage medium of claim 11, the D2D subframe bitmap to be comprised in a received system information block.

14. The at least one non-transitory computer-readable storage medium of claim 11, an applicability interval of the D2D subframe bitmap to exceed a pattern duration of the D2D subframe bitmap.

15. The at least one non-transitory computer-readable storage medium of claim 10, the wireless control channel to comprise a physical downlink control channel (PDCCH).

16. The at least one non-transitory computer-readable storage medium of claim 10, the wireless control channel to comprise a D2D control channel.

17. The at least one non-transitory computer-readable storage medium of claim 10, comprising instructions that, in response to being executed at the UE, cause the UE to:
determine a resource pattern bitmap corresponding to the resource pattern index; and
identify the set of subframes comprising D2D transmission resources based on the resource pattern bitmap.

18. User equipment (UE), comprising:
a radio frequency (RF) transceiver to receive device-to-device (D2D) control information via a wireless control channel;
baseband circuitry coupled to the RF transceiver, the baseband circuitry to:
identify a D2D subframe pool comprising a plurality of subframes;
identify a resource pattern index based on the received D2D control information;
based on the resource pattern index, identify among the plurality of subframes of the D2D subframe pool a set of subframes comprising D2D transmission resources; and
construct a D2D data frame for transmission using D2D transmission resources of the identified set of subframes.

19. The UE of claim 18, the baseband circuitry to identify the D2D subframe pool based on a D2D subframe bitmap.

20. The UE of claim 19, the D2D subframe bitmap to be comprised in a received radio resource control (RRC) message.

21. The UE of claim 19, the D2D subframe bitmap to be comprised in a received system information block.

22. The UE of claim 19, an applicability interval of the D2D subframe bitmap to exceed a pattern duration of the D2D subframe bitmap.

23. The UE of claim 18, the wireless control channel to comprise a physical downlink control channel (PDCCH).

24. The UE of claim 18, the wireless control channel to comprise a D2D control channel.

25. The UE of claim 18, the baseband circuitry to:
determine a resource pattern bitmap corresponding to the resource pattern index; and
identify the set of subframes comprising D2D transmission resources based on the resource pattern bitmap.

* * * * *